B. F. GARDNER.
APPARATUS FOR ASSAYING ORE.
APPLICATION FILED SEPT. 6, 1910.
1,009,660.
Patented Nov. 21, 1911.
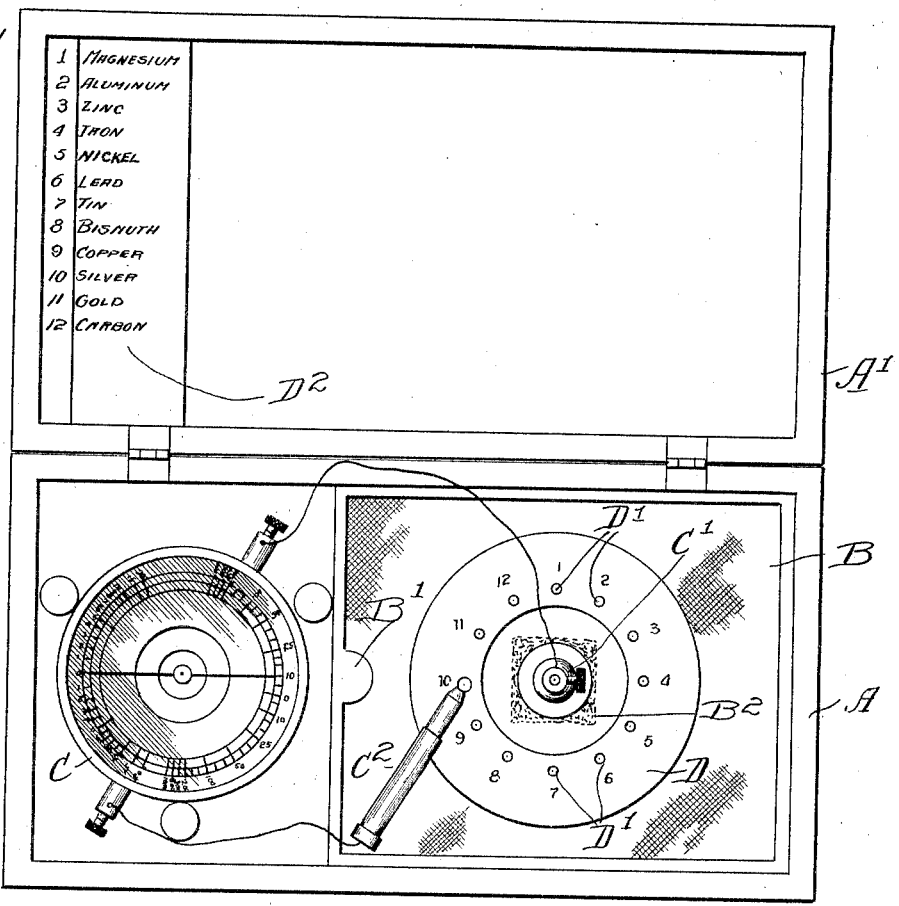
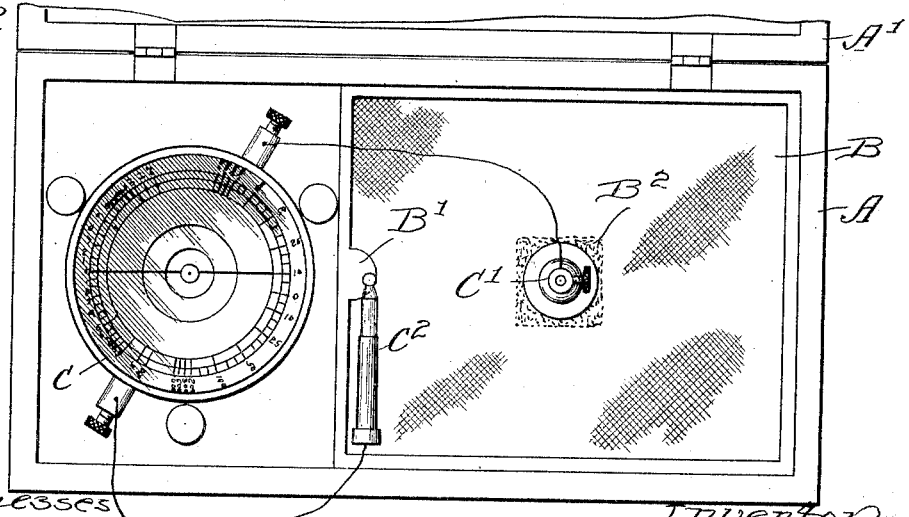

UNITED STATES PATENT OFFICE.

BENJAMIN FULTON GARDNER, OF CHICAGO, ILLINOIS.

APPARATUS FOR ASSAYING ORE.

1,009,660.　　　　Specification of Letters Patent.　　Patented Nov. 21, 1911.

Application filed September 6, 1910. Serial No. 580,754.

*To all whom it may concern:*

Be it known that I, BENJAMIN FULTON GARDNER, a citizen of the United States, residing at Chicago, county of Cook, State of Illinois, have invented certain new and useful Improvements in Apparatus for Assaying Ore, of which the following is a specification.

The object of my invention is primarily to enable the prospector to easily and readily determine the metal content and character of a specimen of ore wherever he may be, thus avoiding the expense, time and trouble of sending the specimen to a distant assayer in order to obtain the information desired.

My invention will also be found of great service in sampling ores and testing the various ore leads in mine development.

In carrying out my method I employ a small portable outfit which may be carried in the hand and operated in any place accessible to man. No technical knowledge is necessary further than to follow the simple directions herein set forth and which accompany the "metalometer," a name which I have given the apparatus used in my method of assaying ore.

Briefly stated my invention consists of an electric battery, one element of which is metal or carbon and the other element, the ore to be assayed. These elements are in contact with an electrolyte and the electric current generated by the pair is measured by a galvanometer or other suitable electric measuring instrument placed in the circuit.

It is not my object to make a quantitative analysis by the invention herein described, but instead, to easily and quickly determine approximately the value of ore by a prospector, or person without knowledge of chemistry, metallurgy or electricity.

With the aid of my "metalometer" the percentage of metal in a specimen of ore is ascertained by reading the deflection of the needle as indicated on the scale of the measuring instrument, which is designed and calibrated for the purpose. To illustrate: A grain of copper in contact with zinc, the galvanic pair in contact with a suitable electrolyte will deflect the needle of a galvanometer. The current generated is proportional to the quantity of metal in the ore. The zinc alone generates no current, but in contact with another metal in an electrolyte, current is generated and it matters not the quantity of zinc, for the current is due entirely to the pair—ore and zinc, and the quantity of current is proportional to the metal content of the ore. Identical metals, *i. e.* zinc and zinc generate no current and my means of identifying the kind of metal in ore is to bring it in contact with the various metals of a multiple electrode and when a balance is found, which is indicated by the needle of my instrument coming to rest at zero, the kind of metal in the ore is determined. In brief, the metal of the ore is the same as the metal of the element in contact with the ore. Hence no current and the index hand comes to rest at zero.

There are many kinds of galvanic batteries, and the only novel feature which I claim is the use of ore as one of the elements, for the purpose of ascertaining the content and character of the metal in the ore used as battery element in the manner stated.

By referring to the drawings, the "metalometer," by which my method is employed, will be more readily explained.

In the drawings, Figure 1 is a plan view with the cover open, showing the arrangement of the "metalometer" to determine the kind of metal in ore. Fig. 2 is the same as Fig. 1, showing arrangement to determine the quantity of metal in ore.

A. in Figs. 1 and 2 is the containing case and $A^1$ in the same figures is the cover of the case.

B. in Figs. 1 and 2 is an electrolyte pad made of an absorbent material and $B^1$ in Figs. 1 and 2 is a metal tray which holds and supports the electrolyte pad B.

$B^2$ in Figs. 1 and 2 is the assay consisting of powdered ore spread upon the surface of the absorbent pad.

C. in Figs. 1 and 2 is a galvanometer or other suitable electrical measuring instrument. $C^1$ and $C^2$ in Figs. 1 and 2 are electrodes connected to the terminals of the circuit leading from the instrument C. to the assay material and the various galvanic elements.

D. in Fig. 1 is a supporting part made of suitable dielectric material in circular form, containing a series of elements.

$D^2$ in Fig. 1 is an index which identifies the galvanic elements numbered in the part D.

The "metalometer" which I use for assaying ore consists of suitable material and size convenient to carry in the hand. Within the case I place a tray made of sheet zinc or it may be made of copper or any metal or carbon, but I find zinc to be cheap and satisfactory. The metal of the tray acts as a galvanic element. The absorbent pad is used to carry an electrolyte without spilling and I find that small pieces of natural sponge placed in the metal tray and over which canvas is stretched and held in place by the turned edges of the tray is suitable. The tray is submerged in a saturated solution of sal-ammoniac and when the absorbent material is thoroughly saturated I place it in the case. A charge of this nature will suffice for ten days and is renewed when necessary. The water of the solution evaporates in time but leaves the salt in the pad and may be moistened repeatedly with water and kept in working order. The circular part D (it may be made square or otherwise fashioned) is formed of wood or other suitable dielectric material. In brief it is a multiple galvanic element support in which the various elements named in the index $D^2$ are placed and numbered. These elements are of the various metals about one inch in length, one quarter of an inch in diameter and round or square as desired. These studs of the various metals fit tightly in holes bored in the supporting ring D. When not in use the wood ring with its elements is carried in the cover of the case and not in contact with the electrolyte pad, otherwise the several metals would be needlessly destroyed by the continuous action of the salts. The instrument C which I use is a form of galvanometer wound and calibrated for the purpose. In brief a reading from the scale I use, would indicate units of metal instead of units of current. The electrode $C^1$ is a flat piece of metal and the electrode $C^2$ is pointed, each, fashioned to be taken in the hands and conveniently manipulated. These hand electrodes are connected by wire cord with the binding posts of the instrument C.

The operation is simple, to illustrate: The prospector will take a specimen of the ore he has discovered and pulverize sufficient to cover a space one inch square. The powdered ore is placed upon the absorbent pad. He will place the flat electrode over and in contact with the ore, but no part of the electrode should touch the pad. The electrode $C^2$ is held in contact with the lug $B^1$ which is integral with the metal of the tray. When properly adjusted the needle of the instrument will be deflected and come to rest at a point on the scale providing there is any metal, other than zinc, in the powdered ore which I will term the assay. If there is no metal in the assay, or if the assay is zinc ore and the metal of the tray is zinc there will be no deflection of the needle of the instrument. If the assay contains metal other than zinc the needle will swing and the metal content of the assay determined by the point on the scale at which the needle rests. In order to determine the kind of metal it will be necessary to place the wood ring upon the pad with the protruding metal elements in contact with the absorbent pad. As before stated the flat electrode is placed upon the assay. The pointed electrode is placed in contact with the metal in the wood ring. The operator moves the electrode from one element to the other so long as there is a deflection of the needle. When he locates an element which causes no deflection he notes the number of the element which generates no current in contact with the assay, and then by referring to the index which corresponds to the inert number learns the kind of metal contained in the assay.

Oxids and salts of metal found in ore are assayed with this apparatus.

Having described my method and apparatus I now claim and desire to secure Letters Patent of the United States for:

An apparatus for assaying ore, comprising a case having compartments, an electric measuring instrument carried in one compartment of said case, and a metal tray in another compartment of said case, absorbent material saturated with an electrolyte within said metal tray, a removable correlated part made of dielectric material in which various metallic elements are fixed and numbered, said correlated part adapted to be placed upon the absorbent material, an index of the names of the elements carried in said correlated part arranged within the case whereby the kind of metal in the ore of an assay may be determined, electrodes connected to the electric measuring instrument, said electrodes adapted to be connected with the tray and the metallic elements for the purpose specified and substantially as described.

BENJAMIN FULTON GARDNER.

Witnesses:
G. D. HALLS,
S. CARR CARROLL.

---

Copies of this patent may be obtained for five cents each, by addressing the "Commissioner of Patents, Washington, D. C."